H. WATKINS.
VEHICLE CANOPY.
APPLICATION FILED DEC. 24, 1919.

1,318,820.

Patented Oct. 14, 1919.

INVENTOR
Harry Watkins
by
Owen, Owen & Crampton

UNITED STATES PATENT OFFICE.

HARRY WATKINS, OF TOLEDO, OHIO.

VEHICLE-CANOPY.

1,318,820.  Specification of Letters Patent.  Patented Oct. 14, 1919.

Application filed March 24, 1919. Serial No. 284,687.

*To all whom it may concern:*

Be it known that I, HARRY WATKINS, a citizen of the United States, and a resident of Toledo, in the county of Lucas and State of Ohio, have invented a certain new and useful Vehicle-Canopy; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a canopy top for vehicles, such as motor trucks, that may be readily removed and readily replaced. It particularly has for its object to provide a canopy top that may be readily rolled up and when thus rolled, placed in a position that will be out of the way of the operators or workmen, particularly while loading and unloading the vehicle or truck. It also provides a means whereby the canopy or cover may be readily manipulated from a position that is handily located with reference to the driver of the vehicle or truck. It also has for its objects other features and advantages that will appear in the following description and upon examination of the drawings.

The invention may be contained in canopies of different forms for vehicles. I have selected a construction containing the invention as an example of such structures and shall describe it hereinafter. The structure selected is illustrated in the accompanying drawings.

Figure 1:
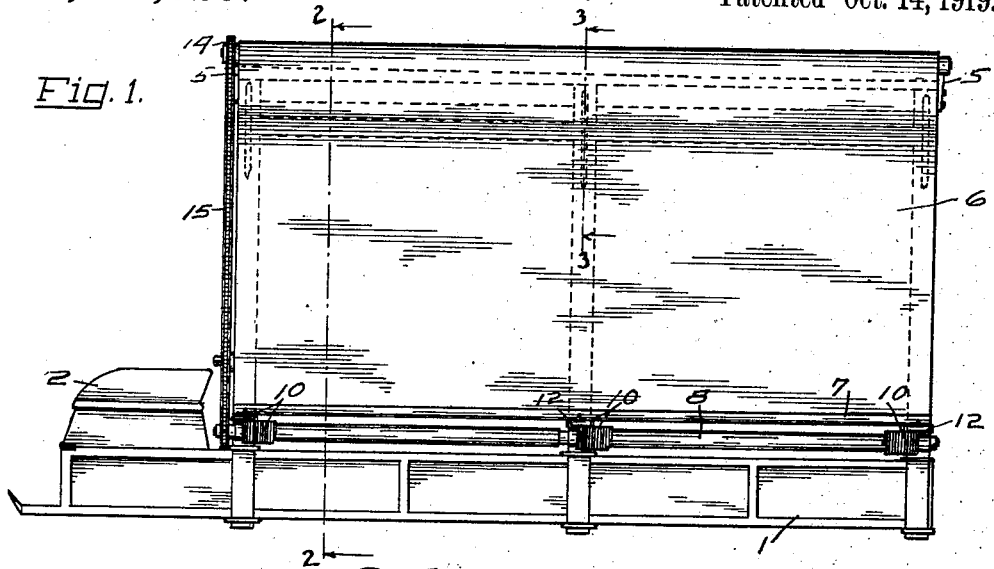
Figure 2:
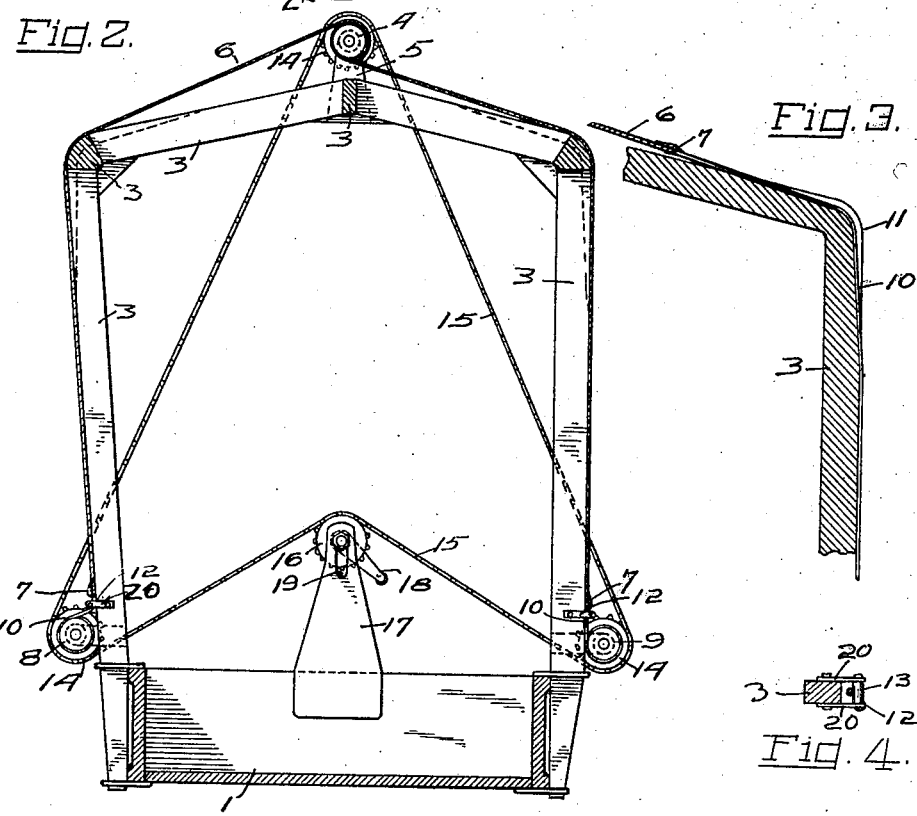
Figure 3:
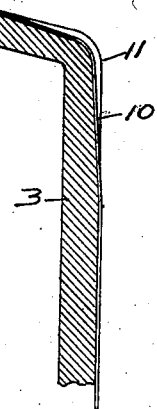
Figure 4:
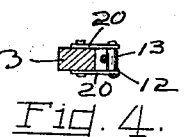

Figure 1 of the drawings is a side view of a vehicle body and the canopy top, Fig. 2 is a sectional view taken on the line 2, 2 indicated in Fig. 1, Fig. 3 is a broken sectional view taken on the line 3, 3 when the canopy top is rolled up in larger part, and Fig. 4 illustrates a guide.

1, Fig. 1, is the vehicle body having the driver's seat 2. The top is provided with a frame 3 consisting of upright posts and horizontally disposed connecting members. On the top of the frame 3 is located a roller 4 which is supported in suitable end bearings 5. The canopy formed of sheet material, preferably canvas, is secured along its center line to the roller 4 and so that when the roller 4 is rotated, it will roll the canvas up drawing it from its side edges 7. The top is also provided with the rollers 8 and 9 to which the edges 7 of the canopy are connected by the ropes 10. When the roller 4 is rotated so as to draw the edges 7 upward, the ropes 10 are unwound from the rollers 8 and 9. The ropes move along the uprights of the frame 3 and when the edges of the canopy reach the top corners of the frame, the ropes pass into grooves 11 located in the corners of the frames and in the upper ends of the uprights and the outer ends of the transverse substantially horizontal parts of the frame. The grooves 11 operate not only to guide the ropes but to keep the ropes in position and prevent dislocation of the ropes when the canopy is rolled upon the roller 4. As a further guide for the ropes and also to keep the ropes and the canopy close to the uprights 3, guide members 12 are provided which are secured to the uprights of the frame. The guide members comprise a roller 13 and two side members 20 between which the rollers 13 are located. The rollers 13 are located close to the uprights of the frame and operate to keep the ropes 10 close to the uprights of the frame and also to keep the portions of the canopy between its side edges and the upper corners of the frame close to the uprights of the frame.

The rollers are provided with means whereby they are caused to operate together so as to keep the ropes and the canvas taut. They are provided with sprocket gear wheels 14 that are connected together by the sprocket chain 15. Rotation of any one of the rollers will cause rotation of the other rollers. The sprocket wheels and the sprocket chain are preferably located in the front end of the vehicle in order that there may be free access to the rear end of the vehicle and to the under side of the frame. They are also located in the front end in order that they may be conveniently located for purposes of operation and manipulation by the driver of the vehicle. A sprocket wheel 16 located in proximity to the driver's seat 2 and mounted on a suitable upright 17 may be operated by a suitable crank 18 to cause movement of the sprocket chain 15 and consequent rotation of the rollers 4, 8 and 9. The bearing of the sprocket wheel 16 may be made adjustable along the slot 19 formed in the upright 17 so as to not only keep the chain 15 reasonably taut but also to permit ready adjustment of the rollers 8 and 9 with reference to any slack that may exist or develop in the ropes 10 and the canopy 6. It provides a means whereby the chain 15 may be readily slackened and the rollers 8 and 9 may be readily turned so as to bring the canvas and the ropes to the required tautness and then the chain 15 may be tightened to a suitable degree and the wheels 16 secured in position.

I claim:

In a canopy for vehicles, rollers, a canopy connected to one of the rollers along the center line of the canopy, ropes interconnecting the side edges of the canopy with the other of the rollers, sprocket wheels connected to the rollers, a sprocket chain interconnecting the sprocket wheels, an adjustable sprocket wheel for operating on the sprocket chain for causing rotation of the other sprocket wheels and rollers to wind and unwind the canopy and the ropes.

In testimony whereof I have hereunto signed my name to this specification.

HARRY WATKINS.

Copies of this patent may be obtained for five cents each, by addressing the "Commissioner of Patents, Washington, D. C."

It is hereby certified that in Letters Patent No. 1,318,820, granted October 14 1919, upon the application of Harry Watkins, of Toledo, Ohio, for an improvement in "Vehicle-Canopies," an error appears requiring correction as follows: In the heading of the drawings, date of filing application, for "Dec. 24, 1919" read *March 24, 1919;* and that the said Letters Patent should be read with this correction therein that the same may conform to the record of the case in the Patent Office.

Signed and sealed this 27th day of April, A. D., 1920.

[SEAL.]

M. H. COULSTON,

*Acting Commissioner of Patents.*

Cl. 296—98.